United States Patent [19]

Murphree

[11] Patent Number: 5,330,639
[45] Date of Patent: Jul. 19, 1994

[54] MOBILE WATER AGITATING AND AERATING APPARATUS

[76] Inventor: Larry Murphree, Rte. #1, Box 186A, Myrtle, Miss. 38650

[21] Appl. No.: 984,778

[22] Filed: Dec. 3, 1992

[51] Int. Cl.$^5$ ............................................. C02F 7/00
[52] U.S. Cl. ................................. 210/170; 210/219; 210/242.2; 261/92; 261/120
[58] Field of Search .............. 210/602, 747, 170, 758, 210/242.2, 198.1, 219; 261/92, 120

[56] References Cited

U.S. PATENT DOCUMENTS

| | | | |
|---|---|---|---|
| 3,595,538 | 7/1971 | Baumann | 210/242.2 |
| 3,755,142 | 8/1973 | Whipple, Jr. | 210/242.2 |
| 3,759,495 | 9/1973 | Boler et al. | 210/242.2 |
| 4,190,619 | 2/1980 | Cherne | 210/242.2 |
| 4,318,700 | 3/1982 | Price | 440/26 |
| 4,485,013 | 11/1984 | Cockman | 210/242.2 |
| 5,043,064 | 8/1991 | Abell et al. | 210/242.1 |
| 5,116,501 | 5/1992 | House | 210/242.2 |

OTHER PUBLICATIONS

Environmental Equipment Engineering, Inc., "Energy Efficient Floating Aerators," Mechanicsville, Va., ©1989, 20 pages.

Aqua-Aerobic Systems, Inc., "Aerators," Rockford, Ill., ©1976, 16 pages.

Lakeside, Equipment Corp., "Rotor Aeration in the Oxidation Ditch," Bulletin 143, Barlett, Ill., undated, 12 pages.

Purestream, Inc., "Sigma Low Speed Surface Mechanical Aerator," Florence, Ky., WTD 1284-1425, undated, 8 pages.

*Primary Examiner*—Thomas Wyse
*Attorney, Agent, or Firm*—Shlesinger, Arkwright & Garvey

[57] ABSTRACT

Self-propelled mobile apparatus for aerating water includes a vessel configured for movement across a body of water, and a mechanism contained entirely on the vessel for propelling the vessel across a body of water. A water aerating device is disposed on the vessel for aerating water as the vessel is propelled across a body of water.

A method of aerating a body of water includes placing an entirely self-propelled vessel on a body of water to be aerated, propelling the self-propelled vessel across the body of water, and activating an aeration device disposed on the vessel.

7 Claims, 3 Drawing Sheets

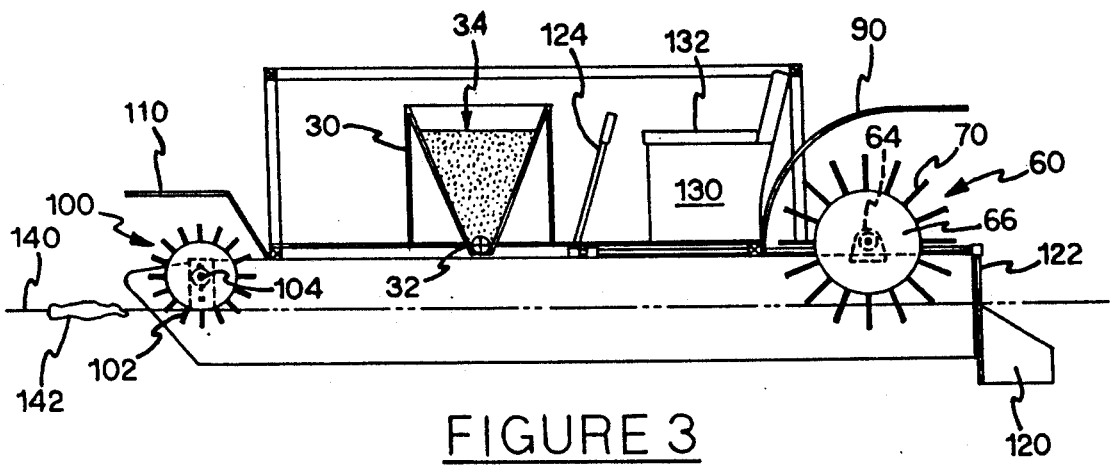
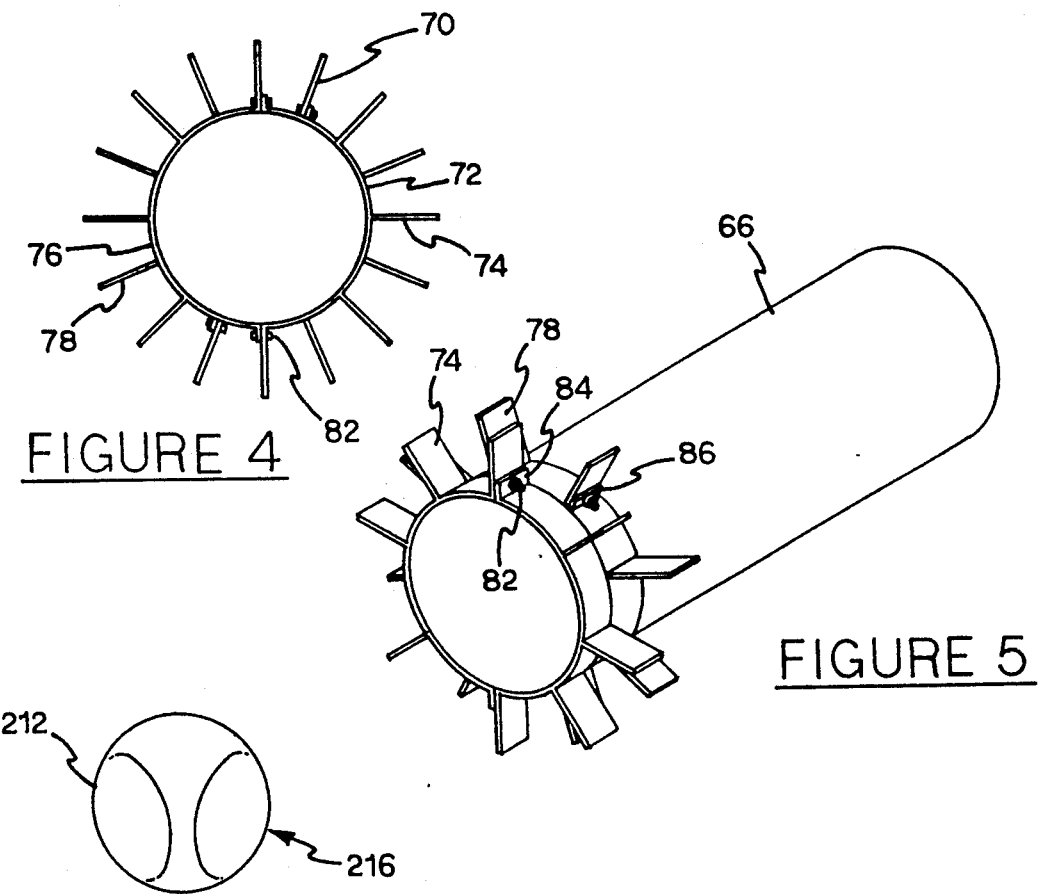

MOBILE WATER AGITATING AND AERATING APPARATUS

FIELD OF THE INVENTION

This invention relates to apparatuses for agitating and aerating bodies of water, specifically to an improved vessel for use in agitating the surface of a body of water and aerating the entire body of water, and to a method of aerating a body of water.

BACKGROUND OF THE INVENTION

Facultative waste stabilization lagoons are currently the predominant tool for the treatment of wastewater by sanitation and public health professionals. Facultative refers to the ability of the bacteria typically used in sewage treatment/waste stabilization to live under more than one set of environmental conditions. Facultative bacteria are useful as they can tolerate the varying physical and chemical conditions resulting from changes in the bodies of water over time, such as when animal waste or plant matter degrades.

Commercial catfish ponds, constructed for the breeding and production of catfish, and other man-made bodies of water typically follow a design similar to facultative waste stabilization lagoons and thus experience many common problems.

Facultative waste stabilization lagoons utilize aerobic and facultative bacteria to stabilize organic waste materials. An adequate on-going supply of oxygen to the body of water is essential in order for the bacteria to perform the stabilization function. Originally, the designers of facultative waste stabilization lagoons, commercial catfish ponds, and other bodies of water relied on the natural process of algal photosynthesis on and below the surface of the water to supply this essential oxygen.

However, repeated experience has shown that various climatic conditions and other external and internal factors may sometimes inhibit the process of algal photosynthesis to the point that the ongoing supply of oxygen to the body of water is inadequate.

Most commonly, this occurs during the warmer months of the year when an overgrowth of algae can occur on the water surface, resulting in filamentous algae mats on the surface which block the radiation of sunlight into the water. In the absence of such sunlight, photosynthesis cannot take place and thus the production of oxygen below the surface is inhibited.

In severe cases, this set of factors causes a septic condition in the body of water in which the biological system within the body of water becomes anaerobic. This phenomenon can eventually result in the release of offensive odors from the lagoon and in the lagoon's failure to meet regulatory effluent limits on the organic discharge from these facilities.

These septic conditions can also occur during cooler months when limited intervals of sunlight result in an inadequate rate of algal photosynthesis. In the context of commercial catfish ponds, these septic conditions can quickly result in the death of the entire fish population.

In response to these problems, inventors previously have created several types of devices to mechanically and/or chemically aerate facultative waste stabilization lagoons, commercial catfish ponds, and similar bodies of water.

U.S. Pat. No. 4,409,107 to Busch discloses a fixed position aerating device which uses a paddlewheel with rotatable paddles to agitate the water near the surface to mix oxygen-rich surface water with oxygen-deficient deep water; however, this device must be moored to the bank of the body of water and hence can only aerate the small area within a narrow radius of the aerator's fixed position. It also does not break up algae masses on the surface.

U.S. Pat. No. 4,680,148 to Arbisi et al. shows an unmanned mobile pond aerating vessel whose movement and position are controlled by a complex microprocessor and beam transmitting/receiving system. The Arbisi device is powered by an electric motor which necessitates the expense and availability of a three-phase power line or other suitable electric power source in close proximity to the pond. Moreover, the unmanned Arbisi vessel cannot be utilized in a pond until trained personnel have programmed the microprocessor in a manner suitable for the particular pond in question; and the complexity of the electronic circuitry and microprocessor render construction and use of the device expensive. These features likely render actual use of the Arbisi vessel overly complicated and time-consuming. Furthermore, Arbisi discloses no mechanism for dispensing chemical agents into the water which, under certain circumstances, is a necessary complementary means of aeration.

U.S. Pat. No. 5,089,120 to Eberhardt broadly discloses a vessel with laterally adjustable pontoons adapted for dispensing into the water a treatment agent, such as lime, for neutralizing acid rain; however, this device fails to recognize the importance of mechanical aeration and surface agitation in combatting the problems outlined earlier. Specifically, the Eberhardt vessel lacks a paddlewheel or any similar device designed for breaking up algae mats in a manner sufficient to cause the submersion and decomposition of such mats. Eberhardt is also relatively large, complex, and expensive.

U.S. Pat. No. 4,268,398 to Shuck et al. discloses a sludge-agitating vessel mounted on pontoons. The Shuck device is designed for operation within a defined radius of a separate pumping station and is dependent on controlled air distribution and compression for carrying out its sludge treatment method. The Shuck device is intended specifically for agitating sludge toward a previously constructed pumping station and is unsuitable for portable use in aerating algae-infested lagoons or ponds absent such a pumping station at each required location.

U.S. Pat. No. 4,441,452 to Strain, Jr. shows a pumping apparatus to be attached to a tractor and backed into a pond to aerate the shallow areas at the edge of the pond. The Strain device is capable of mechanically aerating and destroying algae mats only within a small area radiating from the bank of the body of water.

U.S. Pat. No. 4,190,619 to Cherne discloses a liquid aerating rotor assembly which has a front scoop for preventing solid debris located in the surface layer of liquid form coming in contact with an aerating rotor.

OBJECTS AND SUMMARY OF THE INVENTION

Accordingly, it is an object of the invention to provide an aerating apparatus and method which overcome the problems of conventional devices.

It is a further object of the invention to provide an aerating apparatus which can be freely navigated throughout a lagoon or body of water without any restrictive mooring or fixed position constraints.

It is another object of the invention to provide an aerating apparatus which can be simply and manually navigated.

It is a still further object of the invention to provide an aerating apparatus which can be powered with a simple power plant.

It is another object of the invention to provide an aerating apparatus in which both the amount and degree of aeration can be accurately and precisely adjusted by both mechanical and chemical aeration means.

It is yet another object of the invention to provide an aeration apparatus which can destroy aquatic vegetation.

It is yet a still further object of the invention to provide an aeration apparatus capable of disbanding and dislodging filamentous algae mats and other accumulated masses of organic material on the surface of a body of water so that such masses will sink and decompose.

It is another object of the invention to provide an aeration apparatus which is portable, mobile, and adaptable for use in any body of water without the need for previously constructed auxiliary equipment or devices.

It is a further object of the invention to provide an aeration apparatus which is suited for equalizing the amount of dissolved oxygen throughout a body of water.

It is another object of the invention to provide a method of aerating water that overcomes the drawbacks of conventional water aeration methods.

It is a still further object of the invention to provide a method of aerating water that combines the best of both mechanical and chemical aeration procedures in a highly flexible manner.

It is a still further object of the invention to provide a novel method of destroying aquatic plant life so that the quality of a body of water is enhanced.

In summary, therefore, the invention provides for a self-propelled mobile apparatus for aerating water. The apparatus is comprised of a vessel configured for movement across a body of water, a means disposed on said vessel for propelling said vessel across a body of water, the said propelling means being contained entirely on said vessel and, a first means disposed on said vessel for aerating water as said vessel is propelled across a body of water.

The invention likewise provides a mobile apparatus for destroying aquatic vegetation and for aerating water which includes a vessel configured for movement across a body of water, a means disposed on said vessel for propelling said vessel across a body of water, a first means disposed on said vessel for destroying aquatic vegetation as said vessel is propelled across a body of water containing aquatic vegetation, and a first means disposed on said vessel for aerating water as said vessel is propelled across a body of water.

The invention further provides a method of aerating a body of water by placing an entirely self-propelled vessel on a body of water to be aerated, propelling the self-propelled vessel across the body of water, and activating an aeration device disposed on the vessel for aerating the body of water as the self-propelled vessel moves across the body of water.

BRIEF DESCRIPTION OF THE DRAWINGS

FIG. 3 illustrates a side elevational view of the preferred embodiment of the invention;

FIG. 4 is a side elevational view of a rotor blade assembly according to the invention;

FIG. 5 is a perspective view of the rotor blade assembly of FIG. 4; and

FIG. 6 is a fragmentary, perspective view of one of the preferred embodiments of an aquatic vegetation guiding device according to the invention.

DETAILED DESCRIPTION OF THE INVENTION

Figure 1:
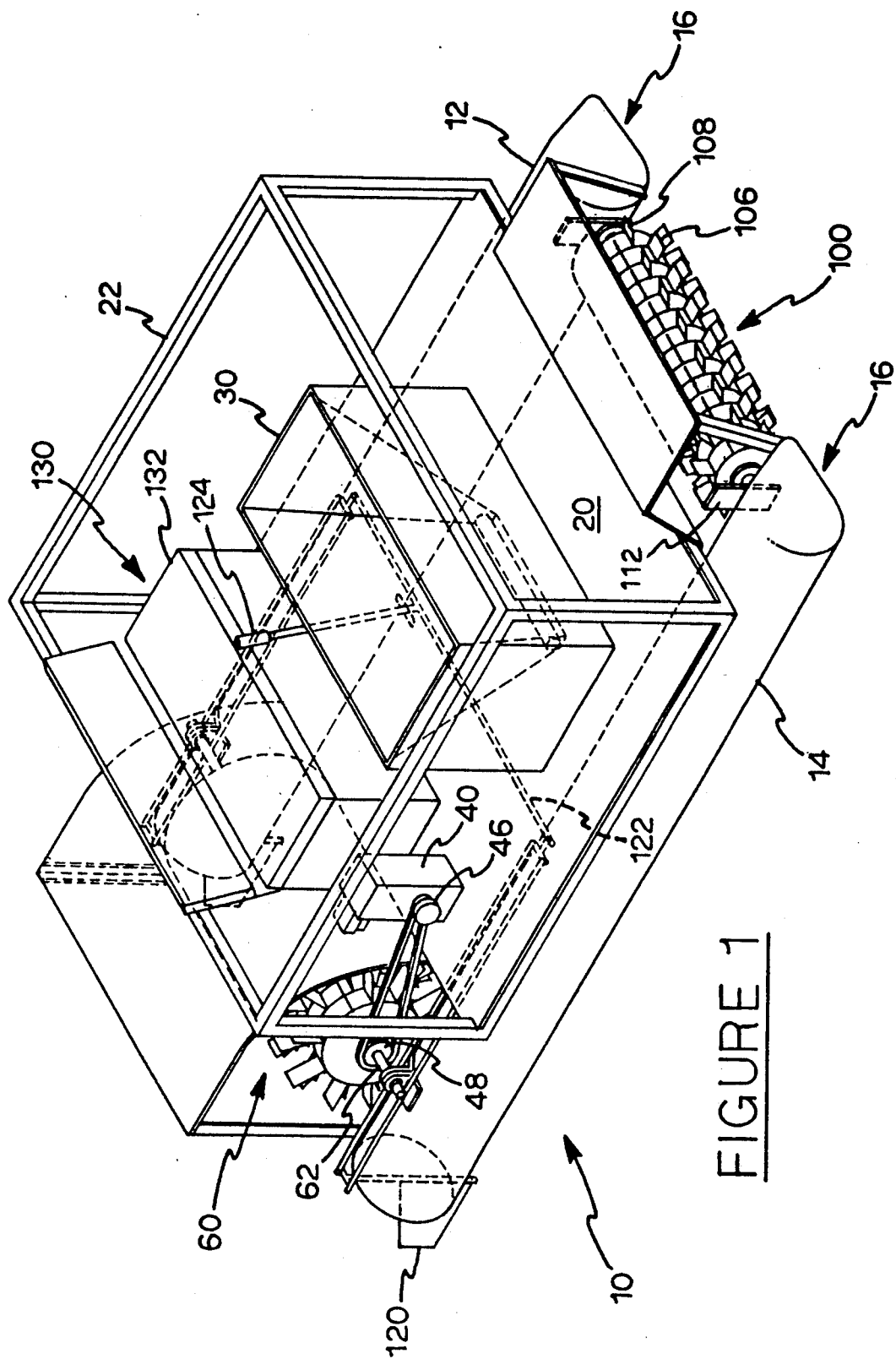
FIG. 1 is a perspective view of a preferred embodiment of a mobile water agitating and aerating apparatus according to the invention, as viewed from above.
Figure 2:
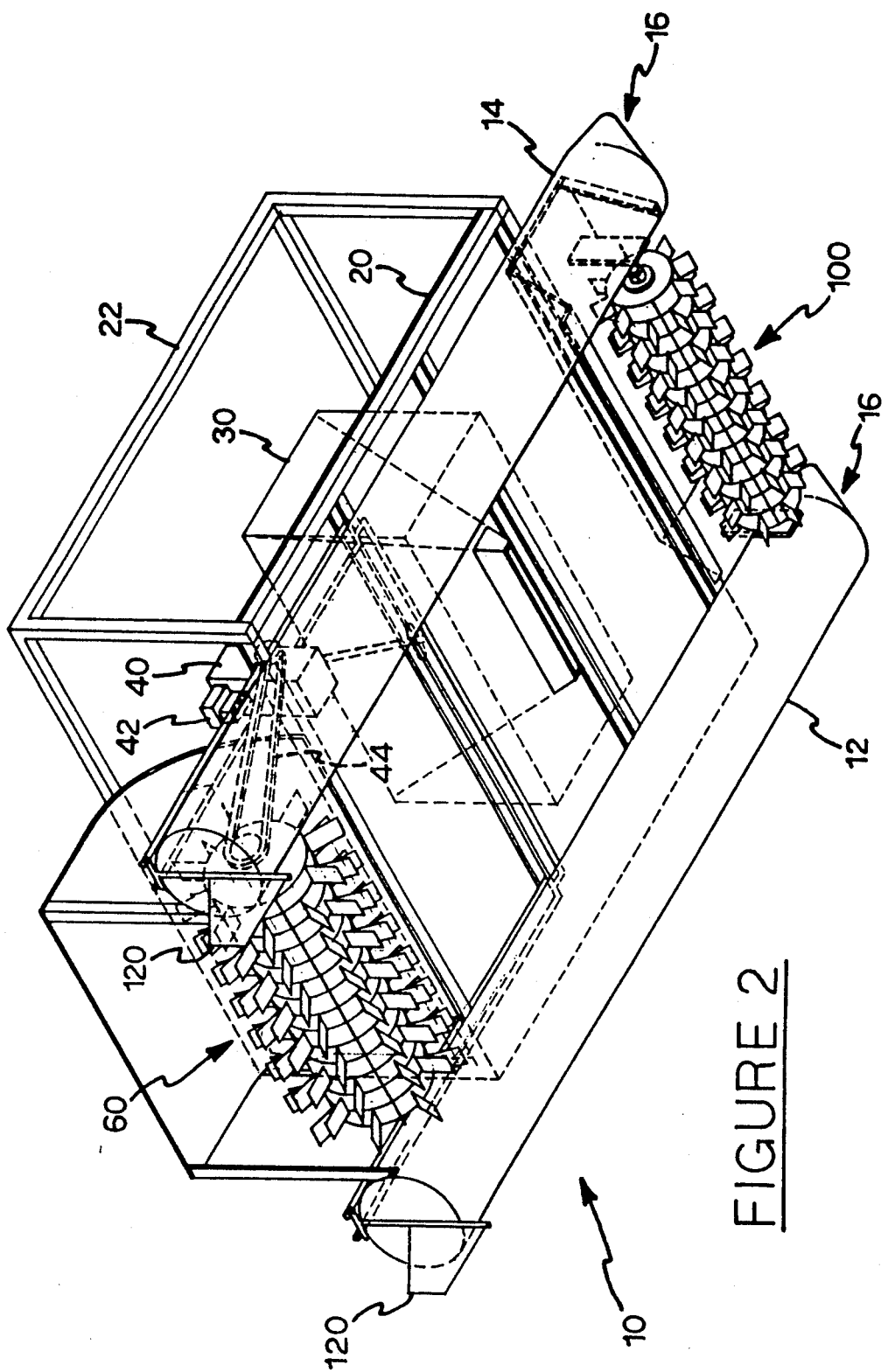
FIG. 2 is a perspective view of the preferred embodiment of FIG. 1, as viewed from below.

A first embodiment of an aeration vessel 10 according to the present invention is illustrated in FIGS. 1-3.

Aeration vessel 10 is supported on left and right pontoons and 14, respectively. An aquatic vegetation guide member 16 is disposed on a forward part of both left pontoon 12 and right pontoon 14, in this embodiment resembling a slightly upwardly offset, blunted cone.

A work platform 20 is mounted on left and right pontoons 12 and 14. Conveniently, a railing 22 circumscribes work platform 20.

A substantially V-shaped dry chemical hopper 30 having a variable feed control 32 is mounted on work platform 20, preferably near the forward end of aeration vessel 10.

An aeration chemical compound 34 is shown in FIG. 3.

An engine/gear box 40 is placed near the rear of aeration vessel 10. A conventional air filter/muffler 42 is attached to engine/gear box 40. Conveniently, the engine drives a V-belt 44 by means of a drive pulley 46 mounted on a horizontal drive shaft powered by an engine/gear box 40. A driven pulley 48 is connected to drive pulley 46 by V-belt 44.

A rear rotor assembly 60 mounted on a driven shaft 62 is powered by driven pulley 48 likewise being mounted on driven shaft 62. Conventional bearings 64 support rear rotor assembly 60. Preferably, rear rotor assembly 60 includes a torque tube 66 and a plurality of rear rotor blades 70. Rear rotor assembly 60 is mounted conveniently between left pontoon 12 and right pontoon 14.

In a preferred construction of rear rotor assembly 60, rear rotor blades 70 include a first semicircular plate 72 from which a plurality of first blades 74 extend outwardly in a radiating fashion. In order to provide a complete array of blades spaced apart and extending from torque tube 66 and surrounding the circumference thereof, a second semicircular plate 76 to which a second plurality of blades 78 are attached, mates with first semicircular plate 74.

A preferred construction of rear rotor assembly 60 is best understood from reference to FIGS. 4 and 5. A nut and bolt attachment 82 detachably secures an extension 84 of first semicircular plate 72 to an extension 86 of second semicircular plate 76. Accordingly, the rear rotor assembly can be inexpensively constructed, and selected ones of the rotor blades can be replaced, as necessary.

Preferably, rear rotor blades 70 are staggered relative to the rotor blades of an adjacent pair of first and second pluralities of blades 74 and 76, so as to achieve better aeration, destruction of aquatic vegetation, and decreased power requirements, when aeration vessel 10 according to the invention is in use.

Conveniently, a rear splash guard 90 extends over rear rotor assembly 60.

A front rotor assembly 100 is similar to rear rotor assembly 60, and, preferably has a smaller nominal diameter.

A plurality of water aerating/aquatic plant destroying blades 102 radiates outwardly from front rotor assembly 100; blades 102 can be constructed in a manner similar to the construction of the blades of rear rotor assembly 60, as will be readily appreciated by a person having ordinary skill in the art. A shaft 104 supports front rotor assembly 100. A plurality of blades 106 is staggered relative to a plurality of blades 108, and a front splash guard 110 extends over a portion of front rotor assembly 100.

A height adjust/locking mechanism 112 is disposed between vessel 10 and shaft 104, so that the height of front rotor assembly 100 relative to pontoons 12 and 14, and hence, the water, is adjustable. Height adjusting-/locking mechanism 112 also is adapted to lock and prevent shaft 104 from rotating.

A steering rudder 120 mounted at the rear of aeration vessel 110 controls the movement of vessel 10 by use of a steering linkage 122 operatively connected to a single stick steering mechanism 124.

An operator's seat 130 is conveniently placed on work platform 20 near the rear of aeration vessel 10, thereby defining an operator's station, and a hinged horizontal seat portion 132 provides access to storage space, as required.

A representative water level 140 on which a mass 142 of aquatic vegetation floats, shows a typical depth at which aeration vessel 10 operates.

An alternative embodiment of a pontoon 212 is shown in FIG. 6. Pontoon 212 has a forward part 216 configured for guiding aquatic vegetation to front rotor assembly 100, the configuration being akin to the prow of an ocean-going ship or to a hemisphere having opposed, left and right dimpled portions.

OPERATION

In use, mobile aeration vessel 10 will be brought to the body of water to be treated in an assembled or disassembled state.

After aeration vessel 10 is placed on a body of water, the engine is started, and the operator engages engine/gear box 40 so that power is transmitted from drive pulley 46 through V-belt 44 to driven pulley 48. In this manner, rear rotor assembly 60 is rotated relative to left and right pontoons 12 and 14, whereby aeration vessel 10 is moved over the body of water. Engine/gear box 40 includes forward and reverse gears whereby even in an embodiment where only rear rotor 60 is powered, rear rotor 60 will be either the leading or the trailing rotor, depending on the physical requirements of the body of water and/or the aquatic vegetation therein.

Typically, rear rotor assembly 60 will be driven in a counter-clockwise fashion as viewed FIG. 3, so that aeration vessel 10 moves from right to left as viewed in FIG. 3. Front rotor assembly 100 is, hence, driven counter-clockwise owing to the movement of the water relative to blades 102.

An appropriate forward speed of aeration vessel 10 is selected by the operator so that the water is sufficiently aerated by the blades of both front rotor assembly 100 and rear rotor assembly 60. The speed of vessel 10 is likewise selected so that aquatic vegetation 142 is sufficiently chopped up and destroyed by blades 102, as well as blades 70, so that the vegetation 142 will sink and decompose.

Concurrently, the operator determines whether chemical aeration compound 34 should be applied based on the dissolved oxygen content of the water, and on the amount of aquatic vegetation 142 present. Accordingly, the operator determines the application rate of aeration chemical 34 by manipulation of feed mechanism 32.

As aeration vessel 10 traverses the body of water, aquatic plant vegetation guides 16 and 216, respectively, guide plant life, such as mats of algae and other scum toward front rotor assembly 100 to ensure that the vegetable matter encounters blades 102.

The placement of left and right pontoons 12 and 14 close to front rotor assembly 100, as well as to rear rotor assembly 60, ensures that aquatic vegetation 142 is trapped between pontoons 12 and 14 so that the front and rear rotor assemblies can adequately break up the vegetation and cause it to sink. The rotor blades chop up vegetation, such as algae mats which form on the surface of catfish ponds and facultative wastewater stabilization lagoons by breaking or chopping up the algae mats into smaller particles which will then settle to the bottom of the body of water and decay.

Rear rotor 60 provides the bulk of the aeration, and continues the break up of the plant matter broken up by front rotor assembly 100.

Under certain conditions, such as the presence of "duck weed" which tends to sufficiently cover the water surface so as to block sunlight and cause anaerobic conditions in the water, front rotor assembly 100 can be locked by use of height adjust/locking mechanism 112 and used as a pusher or water plow. In this manner, aeration vessel 10 could be used to push the offending duck weed towards the banks of the body of water where it could be removed.

In a preferred embodiment of the invention, the pontoons are constructed of 0.080 inch aluminum sheeting. The work platform is constructed of ⅜-inch aluminum non-skid checker plate supported by 2-inch aluminum channel stock, although various other materials are suitable. The railing is suitably constructed of two-inch aluminum and extend around the work platform at a height of 30 to 36 inches in accordance with Occupational Safety and Health Administration (OSHA) standards.

The dry chemical hopper is preferably 2 feet deep, 4 feet wide, and having a capacity of about 4.5 cubic feet.

The self-contained power plant/engine is preferably a horizontal drive gasoline engine mounted on the starboard (right) side of the vessel, and having a rating of about 5 horsepower. Lesser or greater power engines would be suitable depending on the circumstances.

The rear rotor assembly/paddle wheel may have a 30 inch diameter, the rear torque tube having a diameter of about 18 inches, and each of the blades extending outwardly therefrom by about 6 inches. The front rotor assembly may have an overall diameter of about 18 inches, the front torque tube having a diameter of 12 inches, and the blades extending about 3 inches outwardly therefrom. The rear blades may have overall measurement of 6 by 3 inches, and 14 sets of blades may be placed along the length of the torque tube.

The front rotor assembly may likewise have 14 sets of blades extending lengthwise thereof, each of the blades having nominal dimensions of 3 inches by 3 inches.

It is further contemplated that front rotor assembly may be driven, and powered by the same engine or a separate engine, as required. The preferred embodiment would not require a drive mechanism for the front rotor. The front rotor will freewheel due to resistance force of the water as the vessel moves through the water.

The metals used in the construction of the invention are preferably stainless steel and aluminum, although other suitable materials within the skills of a person having ordinary skill in the art are contemplated.

While the invention has been disclosed as having a preferred design, it is understood that it is capable of further modifications, uses and/or adaptations of the invention following in general the principle of the invention and including such departures from the present disclosure as one within known or customary practice in the art of which the invention pertains, and as may be applied to the central features hereinbefore set forth, and fall within the scope of the invention of the limits of the appended claims.

I claim:

1. A mobile apparatus for destroying aquatic vegetation and for aerating water, comprising:
   a) a vessel configured for movement across a body of water;
   b) means disposed on said vessel for propelling said vessel across a body of water;
   c) first means disposed on said vessel for destroying aquatic vegetation as said vessel is propelled across a body of water containing aquatic vegetation and said first aquatic vegetation destroying means includes a freewheeling, unpowered paddlewheel having a plurality of blades; and
   d) first means disposed on said vessel for aerating water as said vessel is propelled across a body of water.

2. A mobile apparatus as defined in claim 1, wherein:
   a) means is provided on said vessel for guiding aquatic vegetation disposed in a body of water toward said aquatic vegetation destroying means.

3. A mobile apparatus as defined in claim 1, wherein:
   a) said vessel includes front and rear portions;
   b) said first aquatic vegetation destroying means is disposed at said front portion; and
   c) said propelling means is disposed at said rear portion.

4. A mobile apparatus as defined in claim 1, wherein:
   a) means is provided on said vessel for distributing a granular chemical water aerating compound.

5. A mobile apparatus as defined in claim 1, wherein:
   a) said propelling means includes second means for aerating water as said vessel is propelled across a body of water.

6. A mobile apparatus as defined in claim 1, wherein:
   a) said propelling means includes a second means for destroying aquatic vegetation as said vessel is propelled across a body of water.

7. A mobile apparatus as defined in claim 1, wherein:
   a) said propelling means includes a self-contained power source disposed on said vessel.

* * * * *